US010885798B2

United States Patent
Khatwa et al.

(10) Patent No.: US 10,885,798 B2
(45) Date of Patent: Jan. 5, 2021

(54) AIRCRAFT TRAFFIC ALERT AND COLLISION AVOIDANCE SYSTEM WITH AUTOFLIGHT SYSTEM MODE PROTECTION

(71) Applicant: HONEYWELL INTERNATIONAL INC., Morris Plains, NJ (US)

(72) Inventors: Ratan Khatwa, Sammamish, WA (US); William Peter Cleveland, Phoenix, AZ (US); Bob D Crouse, Glendale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 86 days.

(21) Appl. No.: 16/225,555

(22) Filed: Dec. 19, 2018

(65) Prior Publication Data
US 2019/0114932 A1    Apr. 18, 2019

Related U.S. Application Data

(63) Continuation-in-part of application No. 15/208,946, filed on Jul. 13, 2016, now Pat. No. 10,192,453.

(51) Int. Cl.
*G08G 5/04* (2006.01)
*G08G 5/00* (2006.01)
*G05D 1/04* (2006.01)

(52) U.S. Cl.
CPC .............. *G08G 5/045* (2013.01); *G05D 1/042* (2013.01); *G08G 5/0004* (2013.01);
(Continued)

(58) Field of Classification Search
CPC ...... G08G 5/045; G08G 5/042; G08G 5/0004; G08G 5/0021; G08G 5/0039; G08G 5/0078
(Continued)

(56) References Cited

U.S. PATENT DOCUMENTS 8,725,401 B2    5/2014   Daveze et al.
8,825,266 B2 *  9/2014   Naderhirn .............. G08G 5/045
                                                   342/109
(Continued)

FOREIGN PATENT DOCUMENTS

EP      0704677 A1    4/1996
EP      3270366 A1    1/2018
WO      2013014338 A1 1/2013

OTHER PUBLICATIONS

Extended EP Search Report for Application No. 17178240.2-1803 dated Nov. 24, 2017.
(Continued)

*Primary Examiner* — Yazan A Soofi
(74) *Attorney, Agent, or Firm* — Lorenz & Kopf, LLP

(57) ABSTRACT

Disclosed is an autopilot-coupled traffic alert and collision avoidance systems (AP TCAS). The AP TCAS includes a an AP/automatic flight control system (AFCS) that is configured to receive a vertical speed setting after the issuance of a preventive resolution advisory, wherein the aircraft vertical speed setting exceeds the maximum vertical speed allowed by the resolution advisory, the AP/AFCS being further configured to: (1) modify the aircraft vertical speed setting so as to be less than the maximum vertical speed, and relay the modified second aircraft vertical speed to an autopilot system of the aircraft to automatically cause the aircraft to fly at a vertical speed in accordance with the modified second vertical speed setting; and (2) relay a command to the autopilot system to initiate an automatic, corrective flight maneuver if a current vertical speed of the aircraft is within a predetermined amount of the maximum vertical speed.

14 Claims, 2 Drawing Sheets

(52) U.S. Cl.
CPC ......... *G08G 5/0021* (2013.01); *G08G 5/0039* (2013.01); *G08G 5/0078* (2013.01)

(58) Field of Classification Search
USPC .......................................................... 701/3
See application file for complete search history.

(56) References Cited

U.S. PATENT DOCUMENTS

| | | | | |
|---|---|---|---|---|
| 10,574,979 | B2* | 2/2020 | Takayama | ............ H04N 17/002 |
| 2005/0055143 | A1* | 3/2005 | Doane | ..................... B64C 13/18 |
| | | | | 701/301 |
| 2008/0021647 | A1* | 1/2008 | Daveze | ................ G08G 5/0021 |
| | | | | 701/301 |
| 2011/0187561 | A1* | 8/2011 | Botargues | ............. G01S 13/933 |
| | | | | 340/961 |
| 2011/0288773 | A1* | 11/2011 | Hoy | ....................... G05D 1/101 |
| | | | | 701/301 |
| 2015/0254991 | A1* | 9/2015 | Claybrough | ......... G05D 1/0825 |
| | | | | 701/3 |
| 2016/0314692 | A1* | 10/2016 | Bahrami | .............. G08G 5/0013 |
| 2018/0018885 | A1* | 1/2018 | Khatwa | ................ G05D 1/0061 |

OTHER PUBLICATIONS

Botargues, Paule, "Airbus AP/FD TCAS Mode: A New Step Towards Safety Improvement", The Briefing Room—Learning From Experience, Hindsight No. 6, Jan. 2008, p. 25-27.

"EASA Certifies New "Autopilot/Flight Director" TCAS Mode for A380", "Enhancing Flight Safety During TCAS Manoeuvers", Aug. 20, 2009 Press Release.

* cited by examiner

AIRCRAFT TRAFFIC ALERT AND COLLISION AVOIDANCE SYSTEM WITH AUTOFLIGHT SYSTEM MODE PROTECTION

CROSS-REFERENCE TO RELATED APPLICATIONS

This Application is a Continuation-In-Part of U.S. patent application Ser. No. 15/208,946, which was filed on Jul. 13, 2016, the contents of which are herein incorporated by reference in their entirety.

TECHNICAL FIELD

The present disclosure generally relates to aircraft traffic alert and collision avoidance system (TCAS) technologies. More particularly, the present disclosure relates to autoflight system mode protection for automated TCAS recovery maneuvers.

BACKGROUND

Since its introduction more than two decades ago, the traffic alert and collision avoidance system (TCAS) has provided tremendous safety advantages by reducing the risk of mid-air collisions. By interrogating the transponders of surrounding aircraft, TCAS analyzes the replies from these transponders to determine the range, bearing, and relative altitude (if reporting altitude) of each surrounding aircraft ("intruder"). TCAS provides a display for traffic awareness, and both aural and visual alerts are issued when a possible mid-air collision hazard becomes imminent. TCAS generally issues two levels of advisories. A traffic advisory (TA) is a caution level alert to inform the crew that closing traffic is in the vicinity of the crew's aircraft ("ownship"). If the intruder continues to close, TCAS issues a warning level resolution advisory (RA) that provides guidance to assure safe vertical separation.

Resolution advisories may further be categorized into two response types. A preventive RA requires the pilot to avoid certain deviations from the current vertical speed (e.g., "Monitor Vertical Speed", RA requiring the pilot not to climb or descend while in level flight). A Preventive RA does not require the pilot to alter the airplane's existing flight path. A corrective RA requires the pilot to either deviate from current vertical speed (such as "Climb" RA while in level flight), or to maintain an existing climb or descent rate. TCAS provides a vertical speed target for the ownship to maneuver to or maintain in order to provide separation from the intruder.

TCAS bases the alerts on an assumed five-second crew reaction time to achieve adequate separation. A traffic display presents the location of intruder traffic. Compliance with a TCAS RA is mandatory unless the pilot considers it unsafe to do so, or if the pilot has better information about the cause of the RA and can maintain safe separation (e.g., visual acquisition of, and safe separation from, a nearby airplane, obvious TCAS system failure, etc.) The RA display is incorporated into the vertical speed indicator (VSI) or the primary flight display (PFD)/attitude direction indicator (ADI). Green and red zones are presented on the VSI or ADI (pitch ladder) which depict fly-to and avoidance zones, respectively. These are consistent with the required vertical rate or pitch attitude, or limitation of climb or descent, issued by TCAS to avoid a possible collision.

Operational experience shows that pilot response to a TCAS RA is at times incorrect or contrary to TCAS commands, for example the initial pilot response may be too slow, or may not be as aggressive as assumed, or may be in the wrong direction. It is also known that improper maneuvers may lead to excessive altitude gain/loss and incursion of adjacent flight levels. In order to alleviate these problems known in the art, various autopilot-coupled TCAS systems are currently under development and testing, which enable the autopilot to automatically fly TCAS RA maneuvers per the existing TCAS functionality. Upon full implementation, AP TCAS is expected to significantly reduce incorrect RA responses, resulting in an overall increase in safety.

As noted above, during a Preventive RA, the flight crew is not required to change the aircraft's flight path. Thus, safe separation from an intruder is assured on the current flight path. However, separation will be compromised if the aircraft is maneuvered into the "no fly" vertical speed area depicted on the VSI. Hence, the AP TCAS system does not maneuver the aircraft during Preventive RAs. However, a problem may arise when the aircraft's flight management system (FMS) is programmed with a vertical navigation (VNAV) path or other pitch mode manually selected on the mode control panel (MCP), and this path or mode is continued to be followed during a preventive RA, if the vertical speeds commanded approach the TCAS protected limits.

Accordingly, there remains a need in the art for improved TCAS systems, especially those that are coupled with an aircraft's autopilots systems. The improved TCAS systems would limit the autopilot from commanding vertical speeds contrary to TCAS commands during a preventive RA, and/or initiate an AP TCAS maneuver if the current vertical speed is nearing (or exceeds) the protected TCAS vertical speed limit. Both of these solutions would provide additional protection prior to any onset of the conventional corrective RA and minimize unnecessary maneuvering. Furthermore, other desirable features and characteristics of the disclosure will become apparent from the subsequent detailed description and the appended claims, taken in conjunction with the accompanying drawings and this background of the disclosure.

BRIEF SUMMARY

The present disclosure relates to autopilot-coupled traffic alert and collision avoidance systems (AP TCAS). In one exemplary embodiment, an AP TCAS includes a flight management system (FMS) that is configured to provide a first and a second aircraft vertical speed setting; an autopilot (AP)/automatic flight control system (AFCS) system that is configured to automatically cause the aircraft to fly at a vertical speed in accordance with the first vertical speed setting; a traffic alert and collision avoidance system (TCAS) that senses a range, bearing, and relative altitude of an intruder aircraft, and, based on the sensed range, bearing, and relative altitude, is configured to issue a preventative resolution advisory (RA) that indicates a maximum vertical speed the aircraft should not exceed in order to avoid a conflict with the intruder aircraft; and an AP/AFCS that is configured to receive the second aircraft vertical speed setting after the TCAS issues the preventive RA, wherein the second aircraft vertical speed setting exceeds the maximum vertical speed, the AP/AFCS being further configured to: (1) modify the second aircraft vertical speed setting so as to be less than the maximum vertical speed, and relay the modified second aircraft vertical speed to the AP/AFCS system to automatically cause the aircraft to fly at a vertical speed in accordance with the modified second vertical speed setting; and (2) relay a command to the AP/AFCS system to initiate an automatic, corrective flight maneuver if a current vertical speed of the aircraft is within a predetermined threshold or amount of the maximum vertical speed or exceeds the maximum vertical speed.

This brief summary is provided to describe select concepts in a simplified form that are further described in the Detailed Description. This brief summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
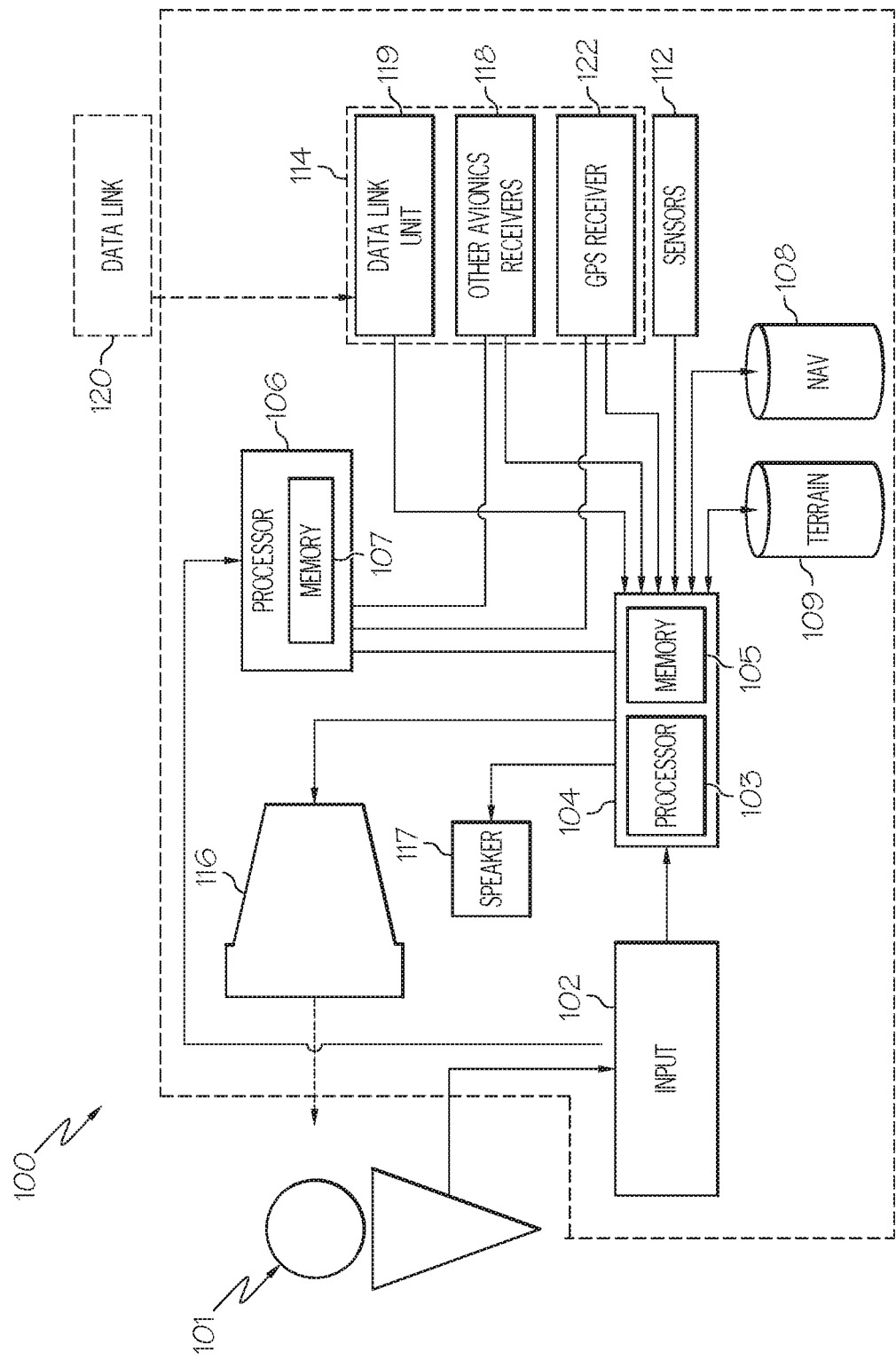
FIG. 1 is a block diagram of a flight system suitable for use in an aircraft in accordance with the exemplary embodiments described herein.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "coupled" together, in particular the AP TCAS. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

Technologies and concepts discussed herein relate to improvements for autopilot coupled traffic alert and collision avoidance systems. The disclosed improvements limit the AP from commanding vertical speeds contrary to TCAS commands during a preventive RA, and/or initiate an AP TCAS maneuver if the current vertical speed is nearing (or exceeds) the protected TCAS vertical speed limit. The autopilot is a system integrated with the aircraft controls. Track/Heading and altitude commands are sent to the autopilot that controls the aircraft by engaging corresponding functionality of the automatic flight control system (AFCS), e.g., Level Change (LVL CHG) for descent, Altitude Hold (ALT HLD) to maintain selected altitude, and Heading or Track hold (HDG/TRK) to maintain selected heading or track. The autopilot systems and algorithms described herein cooperates with other on board equipment, in particular TCAS as noted above, and additionally, for example, weather radar, enhanced ground proximity warning system (EGPWS), and flight management system (FMS).

Referring to FIG. 1, an exemplary flight deck navigation system 100 is depicted and will be described for implementing embodiments of the present disclosure. The system 100 includes a user interface 102, a navigation computer 104 (for example, an FMS), a processor 106, one or more navigation databases 108, one or more terrain databases 109, various optional sensors 112, various external data sources 114, and a display device 116. In some embodiments the user interface 102 and the display device 116 may be combined in the same device, for example, a touch pad. The user interface 102 is in operable communication with the FMS 104 and the processor 106 and is configured to receive input from a user 101 (e.g., a pilot) and, in response to the user input, supply command signals to the FMS 104 and the processor 106. The user interface 102 may be any one, or combination, of various known user interface devices including, but not limited to, a cursor control device (not shown), such as a mouse, a trackball, or joystick, and/or a keyboard, one or more buttons, switches, or knobs.

The FMS 104 may include one of numerous known general-purpose microprocessors 103 or an application specific processor that operates in response to program instructions. In the depicted embodiment, the FMS 104 includes on-board memory 105. The program instructions that control the processor 103 may be stored in the memory 105. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

The processor 106 operates to monitor and direct the navigation of the aircraft, and is coupled to the FMS 104, GPS receiver 122 and the other avionics receivers 118. The processor includes memory (107) for storing instructions (software) and data from the FMS 104, GPS receiver 122, and other avionics receivers 118.

The memory 105, 107 may be realized as RAM memory, flash memory, EPROM memory, EEPROM memory, registers, a hard disk, a removable disk, a CD-ROM, or any other form of storage medium known in the art, in particular non-transitory storage means. In this regard, the memory 105, 107 can be coupled to the processor 103, 106, respectively, such that the processors 103, 106 can be read information from, and write information to, the memory 105, 107. In the alternative, the memory 105 may be integral to the processor 103, and the memory 107 may be integral to the processor 106. As an example, the processor 106 and the memory 107 may reside in an ASIC. In practice, a functional or logical module/component of the navigation system 100 might be realized using program code that is maintained in the memory 107.

The processors 103, 106 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

No matter how the processor 103 is specifically implemented, it is in operable communication with the processor 106, the navigation databases 108, autopilot system, and the display device 116, and is coupled to receive various types of aircraft state data from the various sensors 112, and various other environment related data from the external data sources 114. The processor 103 is configured, in response to the inertial data and the avionics-related data, to selectively retrieve navigation data from one or more of the navigation databases 108, and to supply appropriate display commands to the display device 116. The display device 116, in response to the display commands from, for example, a touch screen, keypad, cursor control, line select, concentric knobs, voice control, and data link message, selectively renders various types of textual, graphic, and/or iconic information.

The terrain databases 109 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 109 and the navigation databases 108 are, for clarity and convenience, shown as being stored separate from the processor 104, all or portions of either or both of these databases 109, 108 could be loaded into the memory 105, or integrally formed as part of the processor 104. The terrain/taxiway databases 109 and navigation databases 108 could also be part of a device or system that is physically separate from the system 100.

The navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the navigation databases 108 are, for clarity and convenience, shown as being stored separate from the FMS 104, all or portions of either or both of these databases 108 could be loaded into the memory 105, or integrally formed as part of the processor 103, and/or memory 105. The navigation databases 108 could also be part of a device or system that is physically separate from the system 100.

The sensors 112 may be implemented using various types of sensors, systems, and or subsystems, now known or developed in the future, for supplying various types of aircraft state data. The state data may also vary, but preferably include data representative of the geographic position of the aircraft and also other data such as, for example, aircraft speed, heading, altitude, and attitude.

The number and type of external data sources 114 (or subsystems) may also vary, but typically include for example, a GPS receiver 122, other avionics receivers 118 including, for example, a VOR/ILS, and a data link unit 119. The other avionics receivers would include, for example, a terrain avoidance and warning system (TAWS), a traffic alert and collision avoidance system (TCAS), a flight director, and a navigation computer.

The display device 116, as noted above, in response to display commands supplied from the processor 104, selectively renders various textual, graphic, and/or iconic information, and thereby supply visual feedback to the user 101. It will be appreciated that the display device 116 may be implemented using any one of numerous known display devices suitable for rendering textual, graphic, and/or iconic information in a format viewable by the user 101. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In an embodiment, the display device 116 is configured as a primary flight display (PFD).

Onboard data link 119 is coupled to an external data link 120 and is configured to transmit and receive data from ground stations and other aircraft. Examples of the data received include, for example, weather information, traffic information, route changes, and clearances and alerts (including NOTAMS). In accordance with the present exemplary embodiments, the onboard data link unit 119 transmits a messages related to the emergency descent.

It should be understood that FIG. 1 is a simplified representation of a system 100 for purposes of explanation and ease of description, and FIG. 1 is not intended to limit the application or scope of the subject matter in any way. In practice, the system 100 will include numerous other devices and components for providing additional functions and features, as will be appreciated in the art.

Figure 2:
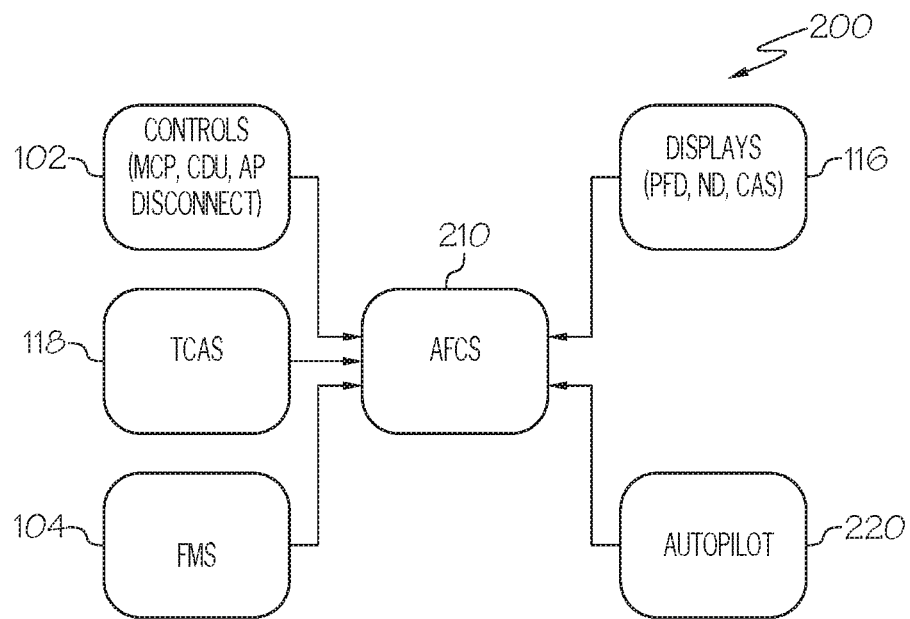
FIG. 2 is a block diagram of an autopilot coupled TCAS implemented in accordance with the exemplary embodiments described herein.

With particular attention now to the above-noted autopilot-coupled TCAS, FIG. 2 presents a schematic illustration of one possible implementation of an AP TCAS 200 suitable for use in accordance with the present disclosure. AP TCAS includes the above-described input controls 102, FMS 104, other avionics receivers (including TCAS) 118, and display 116. These elements are coupled with an automatic flight control system (AFCS) 210, which in turn is coupled with autopilot/autothrottle 220. Many implementations of AFCS 210 and autopilot/autothrottle are known in the art, and thus disclosure should not be understood as limited to any particular configuration or implementation thereof.

As mentioned above, the AP TCAS 200 functions only performs automatic evasive maneuvers in response to TCAS RAs—there is no system response to a TA and pilot monitoring task remains unchanged. The RA recovery guidance provided by TCAS 118 does not change from conventional design and is still based on vertical speed.

Preventive RA's do not require pilot action hence the AP Coupled TCAS 200 will not maneuver the aircraft. The pilot is presented with conventional TCAS aural and visual traffic awareness and alerting. However, the AP TCAS system enters an "armed" state. For a Corrective RA, the system 200 engages with vertical speed target set to "fly out of the red zone/into the green zone". All previously armed pitch modes are cancelled. A "TCAS" flight mode annunciation (FMA) presented on the PFD 116 indicates the new active mode. The flight crew monitors the maneuver by scanning the VSI and PFD RA cues. The AP 220 follows the TCAS RA until "Clear of Conflict" condition or other indication of end of maneuver. The pilot maneuvers back to the original clearance or as per ATC instructions.

Figure 3:
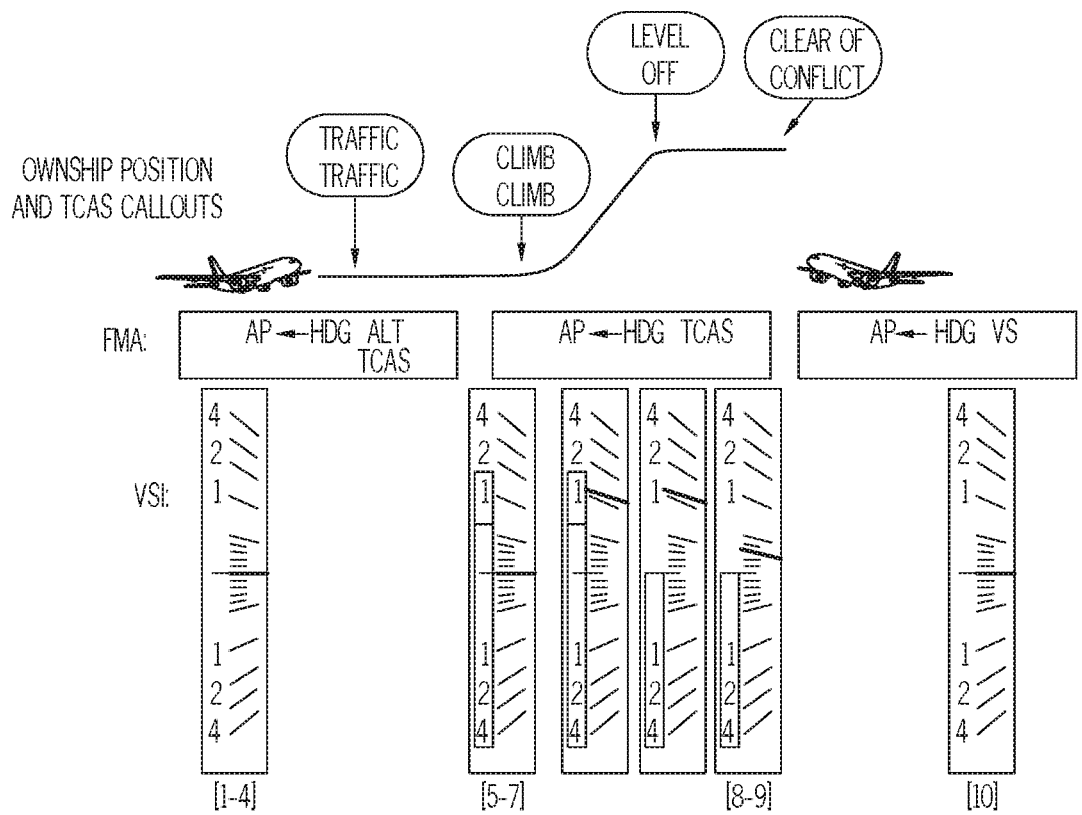
FIG. 3 is a diagram illustrating an example of the operation of the autopilot coupled TCAS of FIG. 2

FIG. 3 presents an example of the AP TCAS 200 operation. Items 1 through 10 are described in FIG. 3 as follows:
1) In this example the AP is engaged in altitude hold ALT;
2) TCAS generates a TA;
3) FMA annunciates "TCAS" as armed;
4) There is no AP TCAS response for a TA, the flight crew is required to monitor traffic;
5) The TCAS generates a Climb Corrective RA;
6) "TCAS" annunciation is provided on the FMA;
7) The AP switches from altitude hold to TCAS mode, the aircraft climbs to avoid the red area/attain the green area of VSI (vertical speed indicator);
8) Airplane levels off at "Level Off" indication (Note—aural is "Adjust Vertical Speed" in TCAS versions prior to 7.1);
9) AP follows TCAS RAs until "Clear of Conflict" or other indication of end of maneuver; and
10) TCAS FMA annunciation is cleared.

As initially noted above, during a preventive RA the flight crew is not required to change the flight path of the aircraft. In this case, TCAS 118 has determined that safe separation from an intruder will be compromised if aircraft is maneuvered into the "no fly" vertical speed area depicted on the VSI (or red zone on the PFD pitch scale). Hence, the AP TCAS 200 does not maneuver the aircraft. It is currently permissible that the FMS 104 programmed VNAV path or other pitch mode manually selected on the mode control panel (MCP) would continue to be followed during a preventive RA. For example, consider the case where an aircraft is coupled to the FMS VNAV path and TCAS issues a vertical speed limit RA (e.g., "Do Not Descend >1000 fpm"). The FMS VNAV path could include a leg with a vertical descent potentially resulting in a maneuver contrary to the TCAS vertical speed limit (e.g., descending very close to or into the restricted avoidance zone). However, note for any flight into the TCAS protected zone, it is expected that the RA would change from a preventive to corrective RA requiring pilot action.

The present disclosure thus provides two improvements to the design above: (a) limit the AP from commanding vertical speed maneuvers contrary to TCAS commands during a Preventive RA; and/or (b) initiate an AP TCAS maneuver if the current vertical speed is nearing (or exceeds) the protected TCAS vertical speed limit. Both of these solutions provide additional protection prior to any onset of the conventional corrective RA.

This disclosed solution requires the addition of a monitor to the flight control system. This monitor would detect if a vertical speed limit is being commanded by TCAS. For (a) above, protection is provided by limiting any vertical mode from commanding vertical speeds in excess of the TCAS protected limit. For example, if TCAS issues a limit to vertical speed commands (e.g., "Do Not Descend >1000 fpm"), and the FMS commands a descent at 1500 fpm, the flight monitor will detect this condition and place a limit on the FMS commanded vertical speed. The aircraft retains the FMS mode, but will limit the descent to 1000 fpm per TCAS issued vertical speed limit.

In another embodiment ((b) above), the current vertical mode would be restricted in maneuvering the aircraft either close to, or within, the protected TCAS vertical speed limit. The AP TCAS initiates recovery if the TCAS protected vertical speed limit is encroached. A viable solution is to enter an "armed" TCAS mode for a preventive RA, and enter an "active" AP TCAS mode should the aircraft enter a pre-determined threshold from the protected vertical speed limit (for example 250 fpm). Upon termination of the RA, the system will dismiss the armed TCAS mode (if it did not engage) or performs a normal end of maneuver transition.

In a further embodiment, note also that although vertical mode protection is described above, the concept can also be applied to lateral mode protection (e.g., TCAS III). For example, in an alternative embodiment, the system may provide inadvertent AFCS lateral maneuver guidance protection in the case where the AP TCAS also engages lateral maneuvering of the aircraft. The intent is to prevent the AFCS from issuing commands contrary to lateral guidance provided by TCAS. Consider the case, where an advanced traffic collision avoidance system issues a "maintain heading" (lateral) command. In this case, the current aircraft heading should be maintained to prevent conflict with laterally off-set traffic. It is conceivable that when arriving at an FMS waypoint while in LNAV mode, the AFCS may automatically issue a heading change compliant with the next FMS leg. This turning command would be contrary to the "maintain heading" collision avoidance guidance. Similarly, the pilot could manually set a new erroneous heading on the guidance control panel. In this embodiment, the system would detect the lateral conflict with traffic and limit the AFCS commanded heading change. This would prevent the AFCS system from initiating the turn maneuver into the protected avoidance zone.

In an alternative embodiment, the system may provide AFCS protection in combination in both lateral and vertical modes. This would ensure that the AFCS commands would be limited in both lateral and vertical modes to ensure that the aircraft maneuvering is limited to the protected zone.

Crossing Restriction Warnings

As described above, the system may provide AFCS protection during any phase of flight. During certain phases of flight, however, the aircraft's flight plan may include one or more crossing restrictions. As used herein, the term "crossing restriction" refers a particular altitude, altitude range, altitude minimum, or altitude maximum that the aircraft must abide by when arriving at (i.e., "crossing") a particular intersection, waypoint, NavAid, or other defined point in space. Crossing restrictions may form a part of a published flight procedure (such as a standard instrument departure procedure or a standard terminal arrival procedure) or they may be issued by air traffic control. In one example of a published crossing restriction, the EAGUL 6 standard terminal arrival procedure for Phoenix Sky Harbor Airport (KPHX) published by the FAA requires an aircraft to cross the GEENO waypoint between 11,000 and 12,000 feet altitude. In another example, an aircraft arriving at the same airport with vectors from air traffic control may be issued the following crossing restriction: "cross 30 miles west of the Phoenix VOR at 10,000 feet."

Such crossing restrictions may be stored in the memory of the FMS, in the case of published procedures, or they may be entered into the FMS by the flight crew, in the case of controller-issued restrictions. In either case, the crossing restriction becomes a part of the flight plan that may be followed by the AFCS. Accordingly, the AFCS may cause the aircraft to climb or descend in a standard profile so as to arrive at the waypoint or intersection at the specified altitude.

It is hypothesized that, if a preventative RA is issued by TCAS while the AFCS is climbing or descending to meet a crossing restriction, the vertical climb or descent rate may be limited by the systems and methods described herein such that it would not be possible to meet the crossing restriction altitude by the time that the aircraft arrives at the respective waypoint or intersection. While many commercially-available TCAS systems include audible or visual warning to draw the flight crew's attention to the preventative RA, such warnings do not include the implication of limiting the climb or descent rate with regard to any crossing restriction. Thus, it is hypothesized that the flight crew's attention may be drawn to the preventative RA and away from the usual tasks of monitoring the flight plan to ensure that each crossing restriction is met, due to the higher workload. Given that the flight crew is required to report to air traffic control if they are unable to meet a crossing restriction altitude, in the aforementioned scenario, the flight crew may inadvertently neglect to do so.

Accordingly, in order to prevent a scenario where the flight crew inadvertently neglects to report to air traffic control the inability to meet a crossing restriction altitude due to the preventative RA, some embodiments of the present disclosure may include a crossing restriction warning or alerting system. In such embodiments, the FMS compares the maximum climb or descent rate permitted by the preventative RA to the climb or descent rate required to meet the crossing restriction. If the maximum permissible rate is less than the required rate, then the FMS system issues a warning or alert to the crew. The warning or alert may be audible or visual. The warning or alert may include any or all of: the crossing restriction identification, the required altitude of crossing, the expected altitude of crossing (given the preventative RA restriction), and a reminder to contact air traffic control, for example.

In another embodiment, it should be appreciated that, to meet crossing restrictions, particularly on arrival procedures, many FMS systems generate what is known as a "top-of-descent," or TOD. The TOD is a point in space where the aircraft begins a descent at a standard profile (such as a 3 degree angle) to meet the crossing restriction altitude upon arriving at the respective waypoint or intersection. In the event that the preventative RA is issued before arriving at the TOD, the FMS system, in some embodiments, may recalculate the TOD in view of the maximum permissible descent rate. That is, the TOD may be moved so as to be encountered earlier in the flight so as to accommodate the limited descent rate (more shallow profile than standard), thereby meeting the crossing restriction and avoiding the need for a report to air traffic control in the first place.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An autopilot-coupled traffic alert and collision avoidance system (AP TCAS) configured to be implemented on an aircraft, the AP TCAS comprising:
   a flight control system that is configured to provide a first and a second aircraft vertical speed setting, and further to provide a first and a second horizontal heading direction setting;
   an autopilot (AP) system that is configured to automatically cause the aircraft to fly at a vertical speed in accordance with the first vertical speed setting and in accordance with the first horizontal heading direction setting;
   a traffic alert and collision avoidance system (TCAS) that senses a range, bearing, and relative altitude of an intruder aircraft, and, based on the sensed range, bearing, and relative altitude, is configured to issue a preventative resolution advisory (RA) that indicates a maximum vertical speed the aircraft should not exceed in order to avoid a conflict with the intruder aircraft and further indicates to maintain the first horizontal heading direction setting;
   an AP/automatic flight control system (AFCS) that is configured to receive the second aircraft vertical speed setting and the second horizontal heading direction setting after the TCAS issues the preventive RA, wherein the second aircraft vertical speed setting exceeds the maximum TCAS vertical speed and wherein the second horizontal heading direction setting is different from the first horizontal heading direction setting, the AP/AFCS being further configured to:

modify the second aircraft vertical speed setting so as to be less than the maximum vertical speed, and relay the modified second aircraft vertical speed to the AP/AFCS system to automatically cause the aircraft to fly at a vertical speed in accordance with the modified second vertical speed setting, and substitute the second horizontal heading direction setting for the first horizontal heading direction setting and relay the first horizontal heading direction setting to the AP/AFCS system to automatically cause the aircraft to continue to fly in accordance with the first horizontal heading direction setting; and an alerting system to alert the flight crew if the second aircraft vertical speed setting is such that a crossing restriction will not be met.

2. The system of claim 1, wherein the flight control system is a flight management system (FMS) or the TCAS.

3. The system of claim 1, wherein the first and second aircraft vertical speed settings form a portion of a vertical profile of a standard instrument departure or standard terminal arrival procedure.

4. The system of claim 1, wherein the AP TCAS commands may be overridden by pilot input.

5. The system of claim 1, wherein upon receipt of the preventive RA, the AP TCAS enters an armed state.

6. The system of claim 5, wherein the AP TCAS enters an active state if the vertical speed of the aircraft encroaches upon a predetermined threshold of the maximum TCAS vertical speed.

7. The system of claim 1, configured to further provide lateral mode protection.

8. A method for aircraft collision avoidance implemented on an autopilot-coupled traffic alert and collision avoidance system (AP TCAS), the method comprising the steps of:

at a flight control system, providing a first and a second aircraft vertical speed setting, and providing a first and a second horizontal heading direction setting;

at an autopilot (AP) system, automatically causing the aircraft to fly at a vertical speed in accordance with the first vertical speed setting and in accordance with the first horizontal heading direction setting;

at a traffic alert and collision avoidance system (TCAS), sensing a range, bearing, and relative altitude of an intruder aircraft, and, based on the sensed range, bearing, and relative altitude, issuing a preventative resolution advisory (RA) that indicates a maximum vertical speed the aircraft should not exceed in order to avoid a conflict with the intruder aircraft and further indicates to maintain the first horizontal heading direction setting;

at an AP/automatic flight control system (AFCS), receiving the second aircraft vertical speed setting and the second horizontal heading direction setting after the TCAS issues the preventive RA, wherein the second aircraft vertical speed setting exceeds the maximum TCAS vertical speed and wherein the second horizontal heading direction setting is different from the first horizontal heading direction setting, wherein the AP/AFCS further:

modifies the second aircraft vertical speed setting so as to be less than the maximum vertical speed, and relays the modified second aircraft vertical speed to the AP/AFCS system to automatically cause the aircraft to fly at a vertical speed in accordance with the modified second vertical speed setting, and substitutes the second horizontal heading direction setting for the first horizontal heading direction setting and relays the first horizontal heading direction setting to the AP/AFCS system to automatically cause the aircraft to continue to fly in accordance with the first horizontal heading direction setting; and at the AP/AFCS, recalculating a top of descent to a crossing restriction in view of the second aircraft vertical speed setting.

9. The method of claim 8, wherein the flight control system is a flight management system (FMS) or the TCAS.

10. The method of claim 8, wherein the first and second aircraft vertical speed settings form a portion of a vertical profile of a standard instrument departure or standard terminal arrival procedure.

11. The method of claim 8, wherein the AP TCAS commands may be overridden by pilot input.

12. The method of claim 8, wherein upon receipt of the preventive RA, the AP TCAS enters an armed state.

13. The method of claim 12, wherein the AP TCAS enters an active state if the vertical speed of the aircraft encroaches upon a predetermined threshold of the maximum TCAS vertical speed.

14. The method of claim 8, wherein the AP TCAS further provides lateral mode protection.

* * * * *